(12) United States Patent
Ross et al.

(10) Patent No.: US 9,503,834 B2
(45) Date of Patent: Nov. 22, 2016

(54) APPLICATION CATALOG ON AN APPLICATION SERVER FOR WIRELESS DEVICES

(71) Applicant: QUALCOMM Incorporated, San Diego, CA (US)

(72) Inventors: David J. Ross, San Diego, CA (US); Jason B. Kenagy, La Jolla, CA (US); Mazen Chmaytelli, San Diego, CA (US); Samir K. Khazaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/676,899

(22) Filed: Nov. 14, 2012

(65) Prior Publication Data

US 2013/0072177 A1    Mar. 21, 2013

Related U.S. Application Data

(63) Continuation of application No. 10/187,694, filed on Jul. 1, 2002, now abandoned.

(51) Int. Cl.
*H04W 4/00* (2009.01)
*G06F 9/445* (2006.01)
(Continued)

(52) U.S. Cl.
CPC ............ *H04W 4/001* (2013.01); *G06F 8/61* (2013.01); *G06Q 30/02* (2013.01); *H04L 29/06* (2013.01); *H04L 67/04* (2013.01); *H04L 67/34* (2013.01); *H04L 69/329* (2013.01)

(58) Field of Classification Search
CPC .......... G06F 8/61; G06Q 30/02; H04L 29/06; H04L 67/34; H04L 67/04; H04L 69/329; H04W 4/001
USPC .................. 709/203, 217–219; 705/7.29–7.41
See application file for complete search history.

(56) References Cited

U.S. PATENT DOCUMENTS 5,821,936 A    10/1998 Shaffer et al.
5,848,421 A    12/1998 Brichta et al.
(Continued)

FOREIGN PATENT DOCUMENTS

| CN | 1254892   | 5/2000 |
| CN | 1348260 A | 5/2002 |
| GB | 2346716   | 7/2003 |

OTHER PUBLICATIONS

European Search Report—EP10180453, Search Authority—Munich Patent Office, Jan. 18, 2011.
(Continued)

*Primary Examiner* — Abdullahi E Salad
(74) *Attorney, Agent, or Firm* — Fariba Yadegar-Bandari; Satheesh K. Karra

(57) ABSTRACT

A system, method, and computer program for providing an application catalog of served applications and data to wireless devices on a wireless network seeking to download the applications and/or data. The application catalog is displayable to a wireless device across the wireless network, and the application catalog lists at least a plurality of applications and/or data downloadable to wireless devices and the application catalog is optimized based upon predetermined criteria such that the preferred application and/or data to be downloaded by a wireless device is initially displayed to a wireless device attempting to access the application catalog.

40 Claims, 5 Drawing Sheets

(51) Int. Cl.
    *G06Q 30/02*     (2012.01)
    *H04L 29/06*     (2006.01)
    *H04L 29/08*     (2006.01)

(56) References Cited

U.S. PATENT DOCUMENTS

| | | | |
|---|---|---|---|
| 6,195,678 | B1 | 2/2001 | Komuro |
| 6,343,318 | B1 | 1/2002 | Hawkins et al. |
| 6,356,543 | B2 | 3/2002 | Hall et al. |
| 6,360,366 | B1 | 3/2002 | Heath et al. |
| 6,401,096 | B1 | 6/2002 | Zellweger |
| 6,401,906 | B1 | 6/2002 | Franz et al. |
| 6,446,048 | B1 | 9/2002 | Wells et al. |
| 6,493,743 | B2 | 12/2002 | Suzuki |
| 6,496,979 | B1 | 12/2002 | Chen et al. |
| 6,553,375 | B1 * | 4/2003 | Huang et al. |
| 6,631,184 | B1 | 10/2003 | Weiner |
| 6,636,873 | B1 | 10/2003 | Carini et al. |
| 6,725,031 | B2 | 4/2004 | Watler et al. |
| 6,792,244 | B2 | 9/2004 | Ross et al. |
| 6,947,772 | B2 | 9/2005 | Minear et al. |
| 7,343,334 | B1 * | 3/2008 | Adduci et al. .............. 705/36 R |
| 2001/0047363 | A1 * | 11/2001 | Peng .......................... 707/104.1 |
| 2002/0045464 | A1 | 4/2002 | Tsuchiyama |
| 2002/0069263 | A1 * | 6/2002 | Sears et al. .................... 709/218 |
| 2002/0131404 | A1 | 9/2002 | Mehta et al. |
| 2003/0027552 | A1 | 2/2003 | Kouznetsov |
| 2003/0065597 | A1 | 4/2003 | Smith et al. |
| 2003/0093794 | A1 * | 5/2003 | Thomas ............ G06F 17/30017 725/46 |
| 2004/0030746 | A1 | 2/2004 | Kavacheri et al. |
| 2004/0203681 | A1 | 10/2004 | Ross et al. |
| 2005/0026592 | A1 | 2/2005 | Walter et al. |

OTHER PUBLICATIONS

European Search Report—EP10181421, Search Authority—Munich Patent Office, Dec. 29, 2010.
International Search Report—PCT/US2003/020912—International Search Authority, European Patent Office, Jun. 4, 2004.
Supplementary European Search Report—EP03742412—Search Authority—Munich—Aug. 17, 2005.

\* cited by examiner

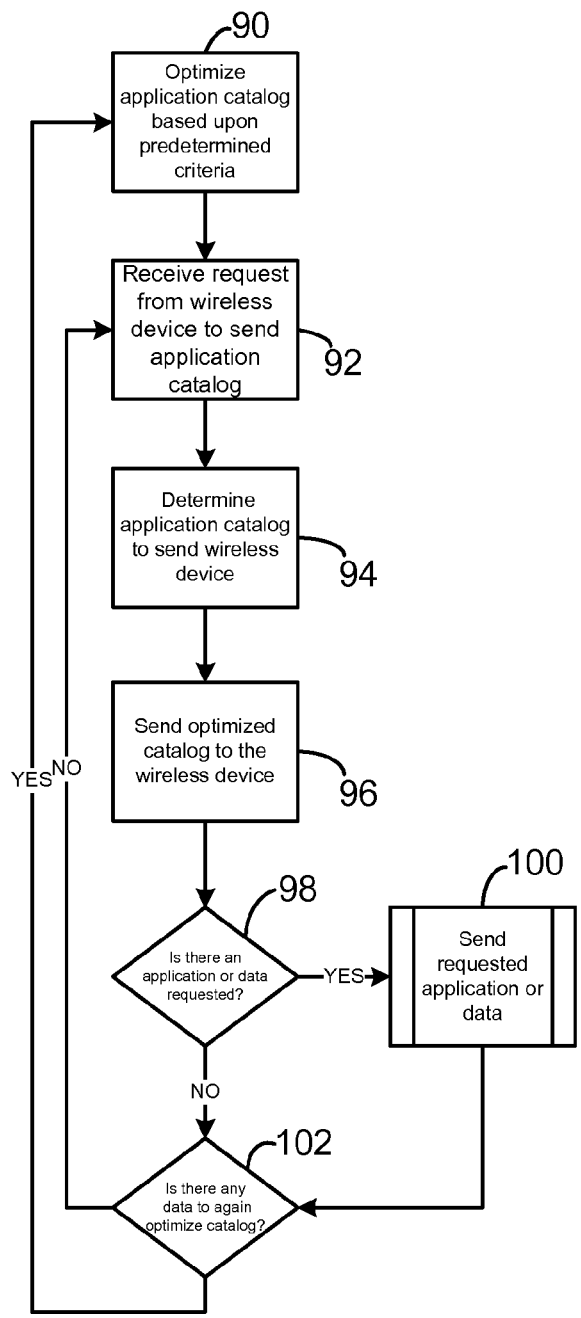
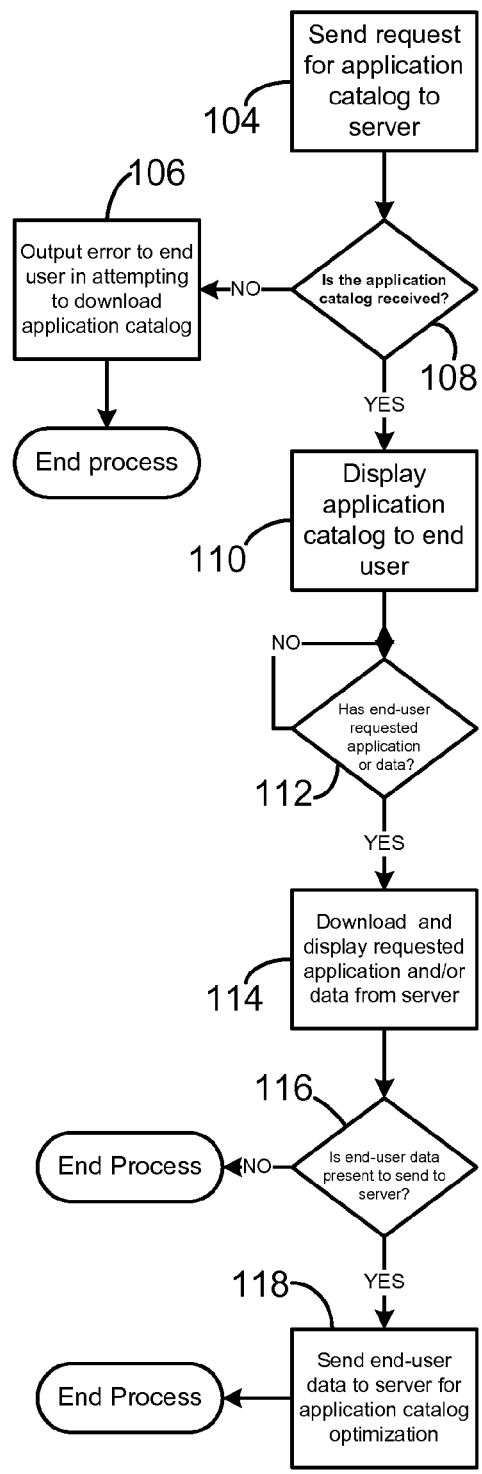
Fig. 5
Fig. 6

APPLICATION CATALOG ON AN APPLICATION SERVER FOR WIRELESS DEVICES

CLAIM OF PRIORITY

The present application for patent is a Continuation of patent application Ser. No. 10/187,694 entitled "APPLICATION CATALOG ON AN APPLICATION SERVER FOR WIRELESS DEVICES" filed Jul. 1, 2002, pending, and assigned to the assignee hereof and hereby expressly incorporated by reference herein in its entirety.

BACKGROUND OF THE INVENTION

I. Field of the Invention

The present invention generally relates to wireless networks and computer communications across the wireless networks. More particularly, the invention relates to the provision of an application catalog that lists a plurality of applications and data that are served to wireless devices across a wireless network, and the application catalog displays available applications and data to the wireless device in an optimal manner.

II. Description of the Related Art

Wireless devices, such as cellular telephones, communicate packets including voice and data over a wireless network. In existing wireless networks, if the user of the wireless device desires to download and use a software application, the user will typically either call a service provider or contact the service provider through another electronic means, such as through a separate Internet access, and the service provider will either transmit the application to the wireless device across the wireless network or allow the user access a network site with the wireless device through the wireless network where the application is downloadable or accessible.

The applications and data that are downloadable to the wireless device can also have overhead implications that the end-user is unaware of, such as large size, popularity of download, or cost to the provider in making a copy available. These factors affecting download are currently accounted for at the service provider side at the time and manner of download. Accordingly, it is to the optimization of application and data transfer across a wireless network that the present invention is primarily directed.

SUMMARY OF THE INVENTION

The invention is a system, method, and computer program for providing an application catalog of served applications and data on a wireless network to wireless devices seeking to download the applications and/or data. The application catalog is displayable to a wireless device across the wireless network, and the application catalog lists at least a plurality of applications and/or data downloadable to wireless devices and the application catalog is optimized based upon predetermined criteria such that the preferred application and/or data to be downloaded by a wireless device is initially displayed to a wireless device attempting to access the application catalog.

The system for providing an application catalog for served applications on a wireless network particularly includes one or more wireless devices in selective communication with the wireless network where each wireless device having and end-user thereof, and one or more application download servers in selective communication to the wireless network, with each application download server selectively in communication with the one or more wireless devices and selectively downloading applications thereto. The application download server further optimizes the application catalog based upon predetermined criteria, such as overhead concerns, financial criteria, or the like, whereby the preferred application to be downloaded by a wireless device is initially displayed to a wireless device attempting to access the application catalog.

The method for providing an application catalog for served applications for wireless devices on a wireless network includes the steps of optimizing an application catalog on an application download server in selective communication to the wireless network, the application catalog optimized based upon predetermined criteria such that the preferred application to be downloaded by a wireless device is initially displayed to a wireless device requesting access to the application catalog, then contacting the server from a wireless device and requesting, from the wireless device, the application catalog. Then the method includes the steps of transmitting the optimal application catalog from the application catalog to the wireless device, and displaying the optimal application catalog to the end-user of the wireless device. The application catalog can be optimized based on one or a number of predetermined criteria, such as end-user ratings, download rates, application server overhead, marketing, advertising costs, application download costs to the end-user, and bandwidth constraints.

The system and method provide an optimal application catalog on an application download server that lists downloadable applications and data to wireless devices that selectively communicate therewith and request the application catalog for viewing. The application catalog is optimizable based upon one or a number of predetermined criteria of the host of the application download server. Furthermore, the application catalog can be dynamically optimized in accord with any change in dynamic predetermined criteria, such as end-user ratings, available bandwidth, and overhead constraints.

Other objects, advantages, and features of the present invention will become apparent after review of the hereinafter set forth Brief Description of the Drawings, Detailed Description of the Invention, and the Claims.

BRIEF DESCRIPTION OF THE DRAWINGS

FIG. 5 is a flowchart illustrating the process executing on an application download server receiving a request from a wireless device for an application catalog, transmitting an appropriate optimized application catalog to the wireless device, and selectively further optimizing the application catalog with any relevant gathered data.

FIG. 6 is a flowchart illustrating the process executing on a wireless device in communication with the application download server of FIG. 5, wherein the wireless device has requested, received, and displayed the optimized application catalog and selectively sends end-user data to the application download server to assist in further optimization of the application catalog.

DETAILED DESCRIPTION OF THE INVENTION

Figure 1:
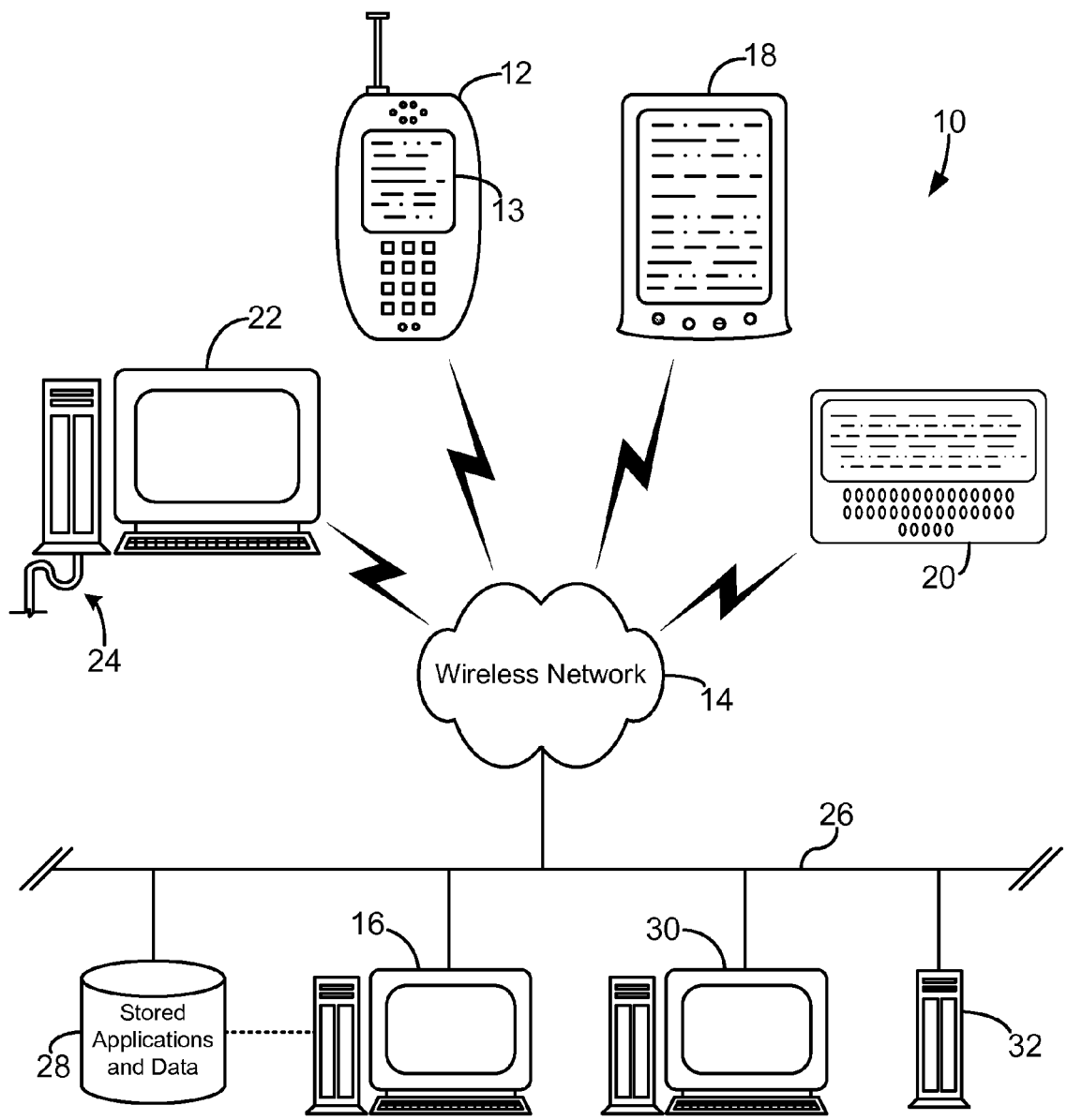
FIG. 1 is a representative diagram of a wireless network and the computer hardware and wireless devices that can be used within the application catalog system.

With reference to the figures in which like numerals represent like elements throughout, FIG. 1 illustrates one embodiment of the present inventive system 10 for providing an optimized application catalog to one or more wireless devices, such as cellular telephone 12, in communication across a wireless network 14 with at least one application download server 16 that selectively downloads software applications or other data to the wireless devices across a wireless communication portal or other data access to the wireless network 14. As shown here, the wireless device can be a cellular telephone 12, with a graphics display 13, a personal digital assistant 18, a pager 20 with a graphics display, which is shown here as a two-way text pager, or even a separate computer platform 22 that has a wireless communication portal, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof.

Figure 4:
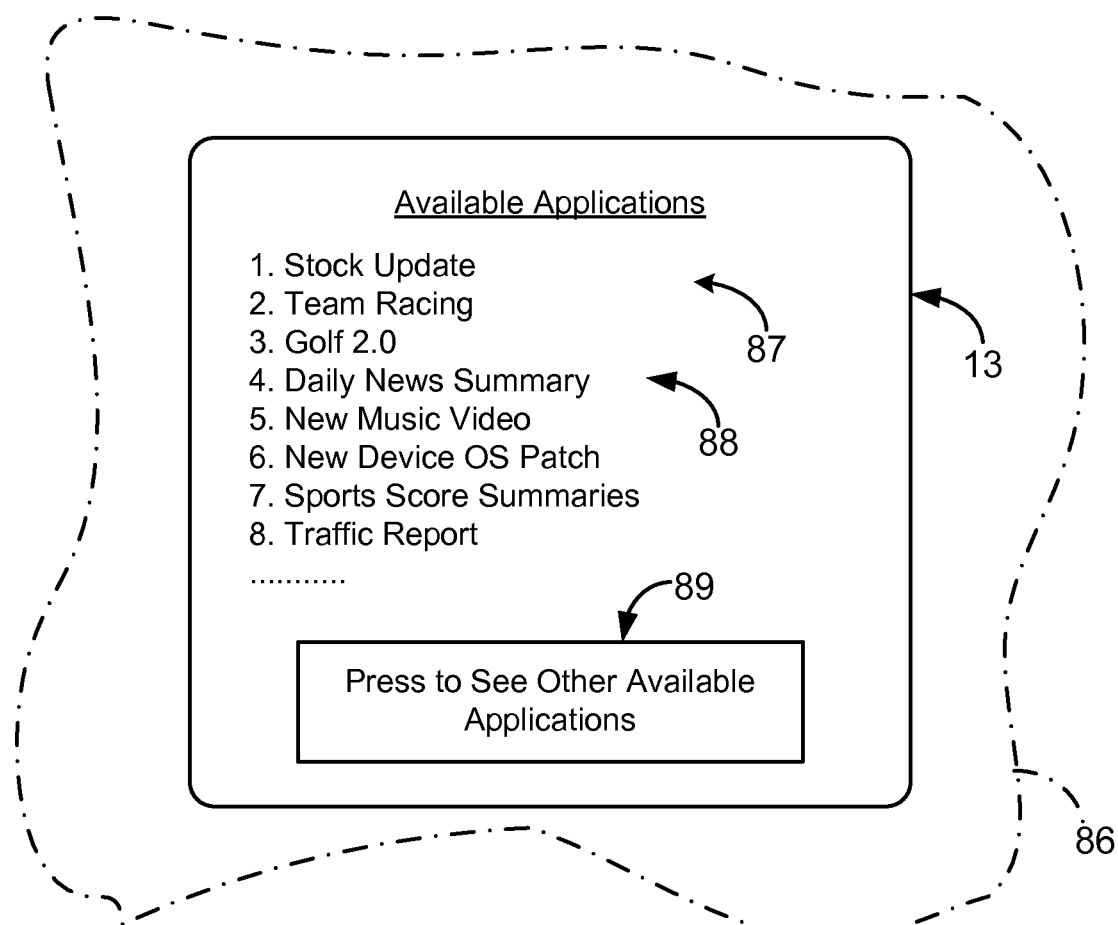
FIG. 4 is an application catalog displayed on a wireless device to an end-user.

The system 10 for providing an application catalog, such as the application catalog 87 shown in FIG. 4, for served applications and data to the wireless devices 12, 18, 20, 22 on the wireless network 14. The term "application" as used herein is intended to encompass executable and nonexecutable software files, raw data, aggregated data, patches, and other code segments. In the system 10, one or more wireless devices 12, 18, 20, 22 that are in selective communication with the wireless network 14, each has and end-user thereof that typical controls the communication connection to the wireless network 14.

One or more application download servers, such as application download server 16 shown here on a local server-side network 26 or other computer elements in communication with the wireless network 14, such as a stored application database 28 that contains software applications and data that are accessible and downloadable to be executable on the wireless devices 12, 18, 20, 22. There is also shown a standalone server 32, a second application download server 30, and in a separate database 28 containing applications and data for the wireless devices 12, 18, 20, 22. All of the components can work in tandem to provide the application catalog 87 and optimization thereof as is further described herein. However, it should be noted that all server-side functions can be performed on one server, such as application download server 16. Further, any computer or server-side computer platform can provide separate services and processes to the wireless devices 12, 18, 20, 22 across the wireless network 14.

Figure 2:
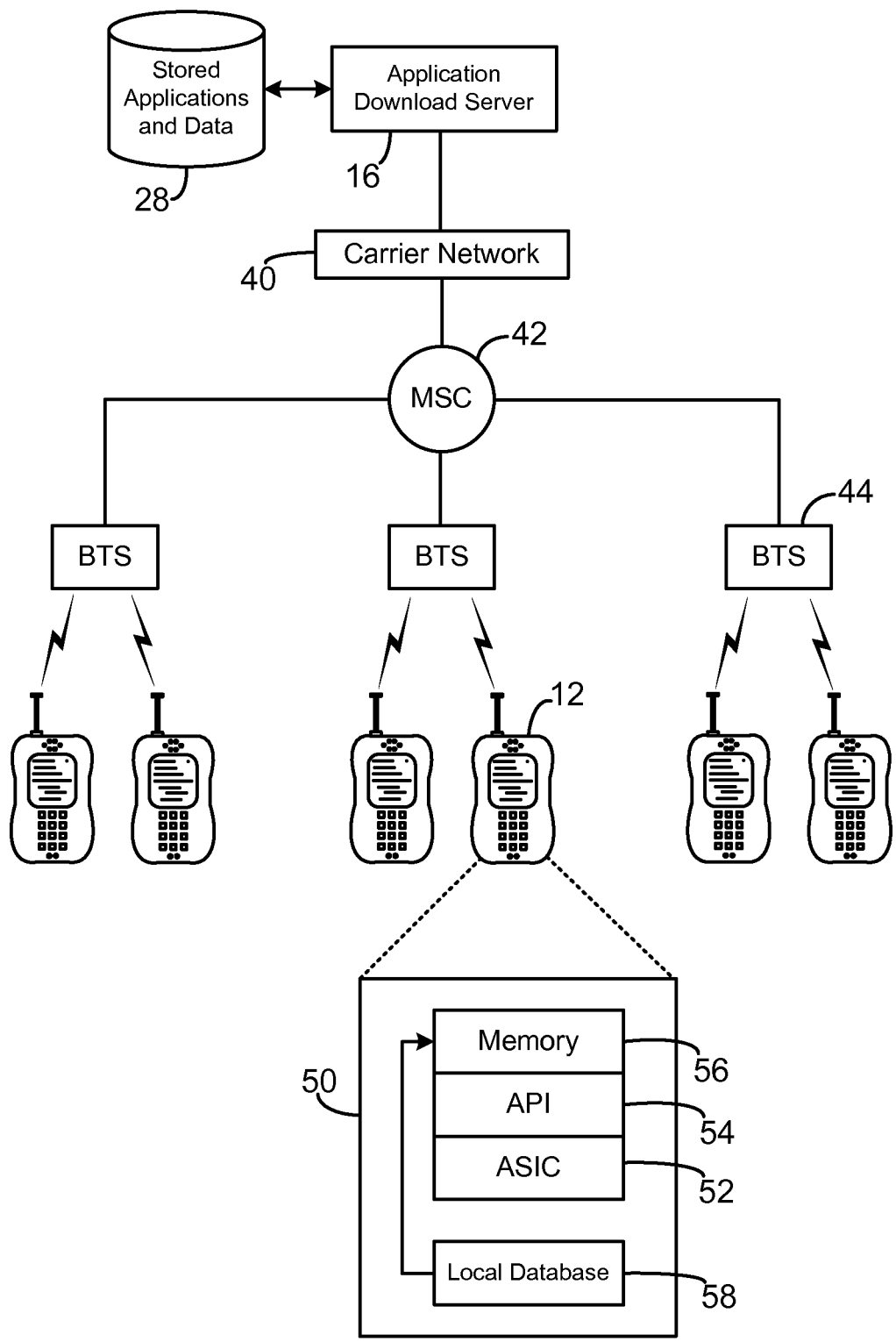
FIG. 2 is a block diagram of the hardware components of the wireless network providing communication between different wireless devices, the application download server, and a separate database of stored applications and data.

FIG. 2 is a block diagram that more fully illustrates the components of the wireless network 14 and interrelation of the elements of the system 10. The wireless network 14 is merely exemplary and can include any system whereby remote modules, such as wireless devices 12, 18, 20, 22, communicate over-the-air between and among each other and/or between and among components of a wireless network 14, including, without limitation, wireless network carriers and/or servers. The application download server 16 and the stored application database 28, and other server-side components, will be present on the cellular data network with any other components that are needed to provide cellular telecommunication services. The application download server 16 communicates with a carrier network 40 through a data link, such as the Internet, a secure LAN, WAN, or other network. The carrier network 40 controls messages (generally in the form of data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes, among other components, an application-specific integrated circuit ("ASIC") 52, or other processor, microprocessor, logic circuit, programmable gate array, or other data processing device. The ASIC 52 is installed at the time of manufacture of the wireless device and is not normally upgradeable. The ASIC 52 or other processor executes an application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications not actively used in memory 56, such as the software applications downloaded from the application download server 16. The local database 58 is typically comprised of one or more flash memory cells, but can be any secondary or tertiary storage device as known in the art, such as magnetic media, EPROM, EEPROM, optical media, tape, or soft or hard disk.

Cellular telephones, such as cellular telephone 12, themselves are being manufactured with increased computing capabilities and are becoming tantamount to personal computers and hand-held personal digital assistants ("PDAs"). These "smart" cellular telephones allow software developers to create software applications that are downloadable and executable on the processor, such as ASIC 52, of the cellular device. The wireless device, such as cellular telephone 12, can download many types of applications, such as games and stock monitors, or simply data such as news and sports-related data. The downloaded data or executed applications can be immediately displayed on the display 13 or stored in the local database 58 when not in use. The software applications can be treated as a regular software application resident on the wireless device 12, 18, 20, 22, and the user can selectively upload stored resident applications from the local database 58 to memory 56 for execution on the API 54. The user of the wireless device 12, 18, 20, 22 can also selectively delete a software application from the local database 58. As a result, end-users of cellular telephones 12 can customize their telephones with programs, such as games, printed media, stock updates, news, or any other type of information or program available for download from application download servers through the wireless network 14.

In developing wireless networks 14, if the end-user of the wireless device desires to download and use a software application, the end-user will attempt to connect to the application download server 16 through bridging a communication connection to the wireless network 14, and attempt to download the desired software application. Once the wireless device contacts the application download server 16, an initial contact is made and the application download server 16 can determines what applications and data are available to that wireless device 12, 18, 20, 22 and send the appropriate information, such as a menu or catalog, for display on the wireless device 12, 18, 20, 22 so the end-user can learn of the available applications.

The conveyance of the menu or catalog however has an associated overhead to the application download server 16, in both size of the application to provide the menu and in the applications that can be downloaded therefrom. Consequently, a poorly arranged menu at the end-user can necessitate further menu downloads by the user, which increases usage of the expensive bandwidth of the wireless network 14 and cost to the end-user. The system 10 therefore provides an optimized application catalog (menu) to the end-user to facilitate application and data download across the wireless network 14.

Figure 3:
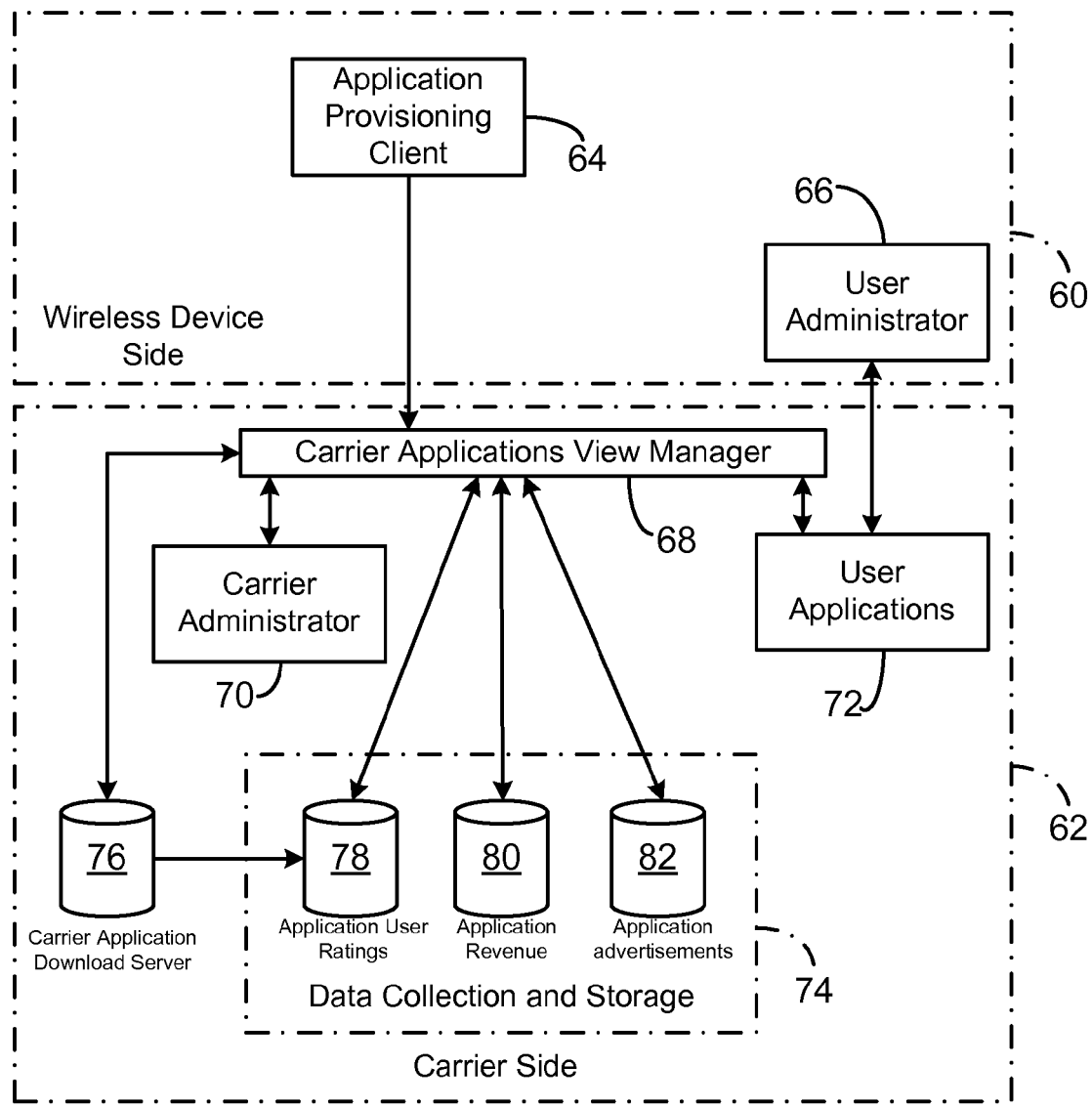
FIG. 3 is a block diagram of the wireless device side components interacting with the carrier side components, and the carrier side components provide the optimized application catalog.

Another embodiment of the system is illustrated in the block diagram of FIG. 3, wherein the component interaction of the wireless device side 60 and the carrier side 62 (such as a cellular telecommunications carrier) is shown. On the wireless device side 60, the application provisioning client 64 is activated by the end-user to access the application download server 16 resident on the carrier side. The user administrator 66 allows the user to control the view of the application catalog, once received at the wireless device side 60, and ultimate user applications 72 interacted with at the carrier side 62. In one embodiment of the user administrator 66, the end-user of the wireless device can override the optimal display of the application catalog 87 (FIG. 4) if so desired. The user administrator 66 can be integrated with the application provisioning client 64 or be a separate object on the wireless device platform 50.

On the carrier side 62, the carrier applications view manager 68 is on the carrier network and interfaces with the carrier's application download server 76 (such as application download server 16), the user applications 72 stored and in execution, and other server-side components, such as databases 78, 80, 82 in the data collection and storage 74. The carrier applications view manager 68 provides a dynamic view of the application catalog 87 (FIG. 4) to the wireless devices 12, 18, 20, 22 based upon the input and interaction with the wireless device, and local control exercised by the carrier. The carrier administrator 70 allows the carrier to control the carrier applications view manager 68 and thus ultimately control the interaction with the wireless device contacting the carrier side 62. The data collection and storage 74 is shown as embodied with a database for application user ratings 78, application revenue 80, and application advertisements 82, all of which can form singly in or in tandem the predetermined criteria to optimize the applications catalog 87.

FIG. 4 is a partial view 86 of the display 13 having an application catalog 87 shown thereon. The application catalog 87 lists at least a plurality of applications 88 downloadable to wireless devices 12, 18, 20, 22, and the displayed applications are optimizable based upon predetermined criteria such that the preferred application to be downloaded by a wireless device is initially displayed to a wireless device attempting to access the application catalog 87. The optimization of the application catalog 87 can occur based upon performance enhancing criteria, such as optimal bandwidth utilization, or economic reasons to the carrier or host of the application download server 16, or some combination of predetermined criteria. The predetermined criteria can include end-user ratings sent from the wireless devices, such as the ratings stored in database 78, and the application catalog 87 can be dynamically optimized based upon ongoing end-users ratings as received. The predetermined criteria can also be based upon the identity of the specific user of the wireless device 12, 18, 20, 22 attempting to access the application catalog 87, in conjunction with some marketing or preference profile of that end-user.

In regard to performance aspects, the predetermined criteria can be based upon the overhead of the server to download the application, or the most commonly downloaded applications (wherein the most commonly download applications appear first to the end-user). And other marketing and advertising concerns can be accounted for at the carrier side to determine application catalog 87 presentation, such as if the applications are sold to wireless devices and the predetermined criteria can application sales data, wherein the greatest profit making applications for the carrier can be first listed on the application catalog 87. Other fiscal predetermined criteria can be advertising time sales, simple slot (list placement) purchase, or other criteria that inure a benefit to the carrier in arranging the application catalog 87.

The predetermined criteria can be stored on the same server that serves the applications transmitted to the server, such as application download server 16, and that server optimizes the application catalog 87. Alternately, the predetermined data and application catalog 87 can be stored on other server-side or networked components, such as database 28 and server 32 (FIG. 1), and the server receives predetermined criteria from another source and then optimizes the application catalog 87, or the server can simply receive an optimized application catalog 87 to provide with the server's particular served applications and data. Any of the functionality as described herein can be shared among several computer devices, as would be known in the art.

As is further shown in the application catalog 87 of FIG. 4, the end-user can be allowed to override the optimal list appearance, such as with a next screen button 89. Other controls can be provided at the wireless device 12, 18, 20, 22 whereby the end-user can customize the wireless device to limit the manner of display of the application catalog 87.

FIG. 5 is a flowchart showing one embodiment of the process executed on the application download server 16 to provide the optimized application catalog 87 is shown in the flowchart of FIG. 5. In the process, the application download server 16 first optimizes the application catalog 87 based upon one or more desired predetermined criteria, as shown at step 90. This step occurs here before any subsequent display of an application catalog 87 such that most optimal application catalog 87 is displayed to the wireless device 12, 18, 20, 22, but can occur at any time on the server 16. Once the application download server 16 receives the request from the wireless device to display the application catalog 87, as shown at step 92, it is determined which application catalog 87 (if so embodied) to display for the particular wireless device 12, 18, 20, 22 requests the application catalog 87. The type of application catalog 87 sent can be varied as a function of optimization or simply due to the specific capabilities of the wireless device.

Once the specific application catalog 87 to send to the wireless device has been determined at step 94, the chosen optimal application catalog 87 is transmitted across the wireless network 14 to the wireless device 12, 18, 20, 22 for display thereon, as shown at step 96. After transmission of the application catalog 87 and a determination is made as to whether an application or data is requested, as shown at decision 98. Decision 98 is a generic determination and if some application and data is requested, a predefined transmission of the application or data is sent, as shown by predefined process 100. After the predefined process 100, or if there was not a request for applications or data at decision 98, a determination is made as to whether there is any data present to update the predetermined criteria, as shown at decision 102. Examples of the data would be ratings data sent from the wireless device 12, 18, 20, 22, recordation of the specific number of the applications downloaded, or recordation of the technical aspects of the download. If there is no data for application catalog 87 optimization at decision 102, then the process returns to wait and receive a request from a wireless device to send an application catalog at step 92. Otherwise, if there is data present to optimize the application catalog 87 at decision 102, then the process returns to step 90 and optimizes the application catalog 87 with the new data.

The flowchart of FIG. 6 illustrates the parallel process on the wireless device 12, 18, 20, 22 in communication with the application download server 16 executing the process shown in FIG. 5. The wireless device 12, 18, 20, 22 sends a request to the application download server 16 to receive an application catalog 87, as shown at step 104, and then a determination is made as to whether the requested application catalog 87 was received, as shown at decision 108. If the application catalog 87 was not received at decision 108, then an error is output to the end-user of the wireless device, as shown at step 106, and the process terminates. Otherwise, once the application catalog 87 is received at decision 108, the application catalog 87 (preferably sent in optimized form from the application download server 16) displays the application catalog 87 on the display of the wireless device, such as display 13 on cellular telephone 12, to the end-user, as shown at step 110.

After display of the application catalog 87 in step 110, a determination is made as to whether the end-user has requested the application and/or data from the application download server 16, as shown at decision 112. If not, decision 112 is reiterated as the process enters a wait-state until an action is taken by the end-user, such as the request of an application or data, or specific end-user termination of the process. If the end-user has requested the download of applications and/or data at decision 112, then the wireless device 12, 18, 20, 22 downloads and displays the requested application and/or data on the wireless device 12, 18, 20, 22, as shown at step 114. Once the application and/or data has been downloaded and displayed, a determination is made as to whether the end-user data is present to send to the application download server 16 (or other networked device) for optimization of the application catalog 87, as shown at decision 116. An example of such data would be an end-user rating of the downloaded application and/or data. If there is no data present at decision 116 to send to the application download server 16 or other computer device for application catalog 87 optimization, then the process terminates. Otherwise, the end-user data is sent from the wireless device 12, 18, 20, 22 to the application download server 16 or computer device across the wireless network 14 for application catalog 87 optimization as shown at step 118, and the process on the wireless device then terminates.

The system 10 thus includes a method for providing an application catalog 87 for served applications for wireless devices 12, 18, 20, 22 on a wireless network 14 including the steps of optimizing an application catalog 87, preferably on an application download server 16 in selective communication to the wireless network 14, based upon predetermined criteria such that the preferred application to be downloaded by a wireless device 12, 18, 20, 22 is initially displayed to a wireless device requesting access to the application catalog 87, as shown in FIG. 4. The method further includes the step of contacting the server from a wireless device 12, 18, 20, 22, as shown at step 92, requesting from the wireless device the application catalog 87, as shown at step 104, transmitting the optimal application catalog 87 to the wireless device, as shown at step 96, and displaying the optimal application catalog 87 to the end-user of the wireless device, such as shown at step 114 and in FIG. 4. The method can additionally include the step of overriding the display of the optimal application catalog at the end-user, such as shown through the change view button 89 in FIG. 4.

The step of optimizing an application catalog 87 based upon predetermined criteria can be optimizing the application catalog based upon one or many criteria, including end-user ratings sent from the wireless devices 12, 18, 20, 22. Thus, the method would then further include the steps of generating end-user ratings for one or more applications from one or more wireless devices 12, 18, 20, 22 and receiving the end-user ratings at the application download server 16 or other computer device, prior to the step of optimizing the application catalog 87. The step of optimizing the application catalog can also include optimization based upon, at least, the specific user of the wireless device 12, 18, 20, 22 attempting to access the application catalog 87, the overhead of the application download server 16 or other computer device to download the application, or the most commonly downloaded applications from the application download server 16 or other computer device.

The method can include the step of selling at least one application to the wireless devices 12, 18, 20, 22, and the step of optimizing an application catalog 87 can include optimizing the application catalog 87 based upon, at least, application sales data. The step of optimizing an application catalog 87 can occur dynamically as the predetermined criteria changes. Moreover, the method can further include the steps of determining the predetermined criteria for application catalog 87 optimization at one computer device on the wireless network 14, such as second application download server 30, or stand-alone server 32, and transmitting the predetermined criteria to a server optimizing the application catalog 87 resident to the server, such as application download server 16.

In view of the method being executable on the computer platform of a wireless device 12, 18, 20, 22, the present invention includes a program resident in a computer readable medium, where the program directs a server or other computer device having a computer platform to perform the steps of the method. The computer readable medium can be the memory of the application download server 16, or can be in a connective database, such as database 28. Further, the computer readable medium can be in a secondary storage media that is loadable onto a wireless device computer platform, such as a magnetic disk or tape, optical disk, hard disk, flash memory, or other storage media as is known in the art.

In the context of FIGS. 5 and 6, the method may be implemented, for example, by operating portion(s) of the wireless network 14 to execute a sequence of machine-readable instructions, such as wireless platform 50, the application download server 16, and stand-alone server 32. The instructions can reside in various types of signal-bearing or data storage primary, secondary, or tertiary media. The media may comprise, for example, RAM (not shown) accessible by, or residing within, the components of the wireless network 14.

Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

The invention claimed is:

1. A system for providing an application catalog over a wireless network, comprising:
    a wireless device; and
    one or more application download servers, each application download server operable to sort each of a plurality of applications that are available for download into either a first set of preferred applications or a second set of applications based on at least one ranking criteria that includes, for one or more of the plurality of applications, a fiscal factor related to profit associated with purchasing of the one or more of the plurality of applications, to generate the application catalog comprising a list of the first set of preferred applications and the second set of applications, wherein the application catalog is configured with a prioritized presentation scheme that presents the first set of preferred applications more prominently than the second set of applications to one or more wireless device users based on the fiscal factor, and to download the application catalog to the wireless device across the wireless network,
    wherein the prioritized presentation scheme is changeable after the application catalog is downloaded to the wireless device based upon an end-user input.

2. A method for providing an application catalog over a wireless network, the method comprising:
    sorting each of a plurality of applications that are available for download into either a first set of preferred applications or a second set of applications based on at least one ranking criteria that includes, for one or more of the plurality of applications, a fiscal factor related to profit associated with purchasing of the one or more of the plurality of applications;
    generating the application catalog comprising a list of the first set of preferred applications and the second set of applications, wherein the application catalog is configured with a prioritized presentation scheme that presents the first set of preferred applications more prominently than the second set of applications to one or more wireless device users based on the fiscal factor;
    receiving a request from a wireless device for the application catalog; and
    transmitting the application catalog to the wireless device,
    wherein the prioritized presentation scheme is changeable after the application catalog is transmitted to the wireless device based upon an end-user input.

3. The method of claim 2, further comprising:
    receiving the at least one ranking criteria from a computer device on the wireless network.

4. The method of claim 2, wherein the at least one ranking criteria further includes preferential list placement within the application catalog that is allocated to an advertiser for the one or more of the plurality of applications.

5. The method of claim 2, wherein the fiscal factor includes the profit made by one or more of the plurality of applications, wherein a first application having a first profit made is sorted in the first set of preferred applications and a second application having a second profit made is sorted in the second set of applications if the first profit made is greater than the second profit made.

6. The method of claim 2, wherein the fiscal factor includes for a respective application from the one or more of the plurality of applications a per-purchase profit multiplied by a sales number corresponding to the respective application.

7. The method of claim 2, wherein the at least one ranking criteria includes a degree to which a user of the wireless device is expected to be interested in the plurality of applications.

8. The method of claim 7, wherein the degree is higher for applications belonging to the first set of preferred applications as compared to applications belonging to the second set of applications.

9. The method of claim 2, wherein the at least one ranking criteria includes application ratings for one or more of the plurality of applications that are collected from multiple wireless devices in the wireless network.

10. The method of claim 2, wherein the at least one ranking criteria includes user-specific preferences associated with a user of the wireless device, such that the prioritized presentation scheme is customized to the user.

11. The method of claim 2, wherein the prioritized presentation scheme presents the first set of preferred applications more prominently by placing the first set of preferred applications in an initial application selection page when the application catalog is loaded by the wireless device, and
    wherein the prioritized presentation scheme presents the second set of applications within one or more supplemental application selection pages that require deeper navigation within the application catalog by a user.

12. The method of claim 2, wherein the application catalog further includes one or more non-application data options for download that are configured for presentation with the prioritized presentation scheme along with the first set of preferred applications, further comprising:
    receiving, in response to the transmitting, a request for at least one non-application data option from the one or more non-application data options; and
    transmitting the requested at least one non-application data option to the wireless device in response to the request for the at least one non-application data option.

13. The method of claim 12, wherein the one or more non-application data options include a stock update, a daily news summary, a sports score summary and/or a traffic report.

14. A method for providing an application catalog over a wireless network, the method comprising:
    sorting each of a plurality of applications that are available for download into either a first set of preferred applications or a second set of applications based on at least one ranking criteria that includes, for one or more of the plurality of applications, a fiscal factor related to profit associated with purchasing of the one or more of the plurality of applications;
    generating the application catalog comprising a list of the first set of preferred applications and the second set of applications, wherein the application catalog is configured with a prioritized presentation scheme that presents the first set of preferred applications more prominently than the second set of applications to one or more wireless device users based on the fiscal factor;
receiving a catalog request from a wireless device; and
transmitting the application catalog to the wireless device,
wherein the prioritized presentation scheme is changeable after the application catalog is transmitted to the wireless device based upon an end-user input.

15. A non-transitory computer-readable medium including instructions stored thereon, comprising:
a first set of instructions for sorting each of a plurality of applications that are available for download into either a first set of preferred applications or a second set of applications based on at least one ranking criteria that includes, for one or more of the plurality of applications, a fiscal factor related to profit associated with purchasing of the one or more of the plurality of applications;
a second set of instructions for generating an application catalog comprising a list of the first set of preferred applications and the second set of applications, wherein the application catalog is configured with a prioritized presentation scheme that presents the first set of preferred applications more prominently than the second set of applications to one or more wireless device users based on the fiscal factor;
a third set of instructions for receiving a request from a wireless device for the application catalog; and
a fourth set of instructions for transmitting the application catalog to the wireless device,
wherein the prioritized presentation scheme is changeable after the application catalog is transmitted to the wireless device based upon an end-user input.

16. The non-transitory computer-readable medium of claim 15, wherein the at least one ranking criteria includes end-user ratings sent from a plurality of wireless devices.

17. The non-transitory computer-readable medium of claim 15, wherein the at least one ranking criteria includes a user identity associated with the wireless device requesting the application catalog.

18. The non-transitory computer-readable medium of claim 15, wherein the at least one ranking criteria includes a computer download overhead associated with each of the plurality of applications.

19. The non-transitory computer-readable medium of claim 15, wherein the at least one ranking criteria includes an application download frequency.

20. The non-transitory computer-readable medium of claim 15, wherein the at least one ranking criteria includes a dynamic criterion that changes over time.

21. The non-transitory computer-readable medium of claim 15, further comprising a fifth set of instructions for receiving the at least one ranking criteria from another computer on a wireless network prior to generating the application catalog.

22. The non-transitory computer-readable medium of claim 15, wherein the at least one ranking criteria further includes preferential list placement within the application catalog that is allocated to an advertiser for the one or more of the plurality of applications.

23. The non-transitory computer-readable medium of claim 15, wherein the fiscal factor includes the profit made by one or more of the plurality of applications, wherein a first application having a first profit made is sorted in the first set of preferred applications and a second application having a second profit made is sorted in the second set of applications if the first profit made is greater than the second profit made.

24. The non-transitory computer-readable medium of claim 15, wherein the fiscal factor includes for a respective application from the one or more of the plurality of applications a per-purchase profit multiplied by a sales number corresponding to the respective application.

25. A wireless device, comprising:
a processor;
a wireless communication interface, coupled to said processor;
a display, coupled to said processor; and
a memory, coupled to said processor;
wherein:
said processor is configured to request an application catalog from an application server over a wireless network, the application catalog comprising a plurality of applications that are sorted into either a first set of preferred applications or a second set of applications based on at least one ranking criteria that includes, for one or more of the plurality of applications, a fiscal factor related to profit associated with purchasing of the one or more of the plurality of applications, to receive the application catalog via said wireless communication interface, store said application catalog in said memory, and display said application catalog on said display in accordance with a prioritized presentation scheme that presents the first set of preferred applications more prominently than the second set of applications based on the fiscal factor,
wherein the prioritized presentation scheme is changeable after the application catalog is received at the wireless device based upon an end-user input.

26. The wireless device of claim 25, wherein the at least one ranking criteria further includes preferential list placement within the application catalog that is allocated to an advertiser for the one or more of the plurality of applications.

27. The wireless device of claim 25, wherein the fiscal factor includes the profit made by one or more of the plurality of applications, wherein a first application having a first profit made is sorted in the first set of preferred applications and a second application having a second profit made is sorted in the second set of applications if the first profit made is greater than the second profit made.

28. The wireless device of claim 25, wherein the fiscal factor includes for a respective application from the one or more of the plurality of applications a per-purchase profit multiplied by a sales number corresponding to the respective application.

29. A method of obtaining an application to download onto a wireless device, comprising:
requesting an application catalog from an application server on a wireless network, the application catalog comprising a plurality of applications that are sorted into either a first set of preferred applications or a second set of applications based on at least one ranking criteria that includes, for one or more of the plurality of applications, a fiscal factor related to profit associated with purchasing of the one or more of the plurality of applications;
receiving the application catalog; and
presenting the application catalog on a user interface of the wireless device in accordance with a prioritized presentation scheme that presents the first set of preferred applications more prominently than the second set of applications based on the fiscal factor,
wherein the prioritized presentation scheme is changeable after the application catalog is received at the wireless device based upon an end-user input.

30. The method of claim 29, wherein the at least one ranking criteria further includes preferential list placement within the application catalog that is allocated to an advertiser for the one or more of the plurality of applications.

31. The method of claim 29, wherein the fiscal factor includes the profit made by one or more of the plurality of applications, wherein a first application having a first profit made is sorted in the first set of preferred applications and a second application having a second profit made is sorted in the second set of applications if the first profit made is greater than the second profit made.

32. The method of claim 29, wherein the fiscal factor includes for a respective application from the one or more of the plurality of applications a per-purchase profit multiplied by a sales number corresponding to the respective application.

33. A wireless device, comprising:
a first means for requesting an application catalog from an application server on a wireless network, the application catalog comprising a plurality of applications that are sorted into either a first set of preferred applications or a second set of applications based on at least one ranking criteria that includes, for one or more of the plurality of applications, a fiscal factor related to profit associated with purchasing of the one or more of the plurality of applications;
a second means for receiving the application catalog; and
a third means for presenting the application catalog on the wireless device in accordance with a prioritized presentation scheme that presents the first set of preferred applications more prominently than the second set of applications based on the fiscal factor.

34. A non-transitory computer-readable medium including instructions stored thereon, comprising:
a first set of instructions for requesting an application catalog from an application server on a wireless network, the application catalog comprising a plurality of applications that are sorted into either a first set of preferred applications or a second set of applications based on at least one ranking criteria that includes, for one or more of the plurality of applications, a fiscal factor related to profit associated with purchasing of the one or more of the plurality of applications;
a second set of instructions for receiving the application catalog; and
a third set of instructions for presenting the application catalog on a wireless device in accordance with a prioritized presentation scheme that presents the first set of preferred applications more prominently than the second set of applications based on the fiscal factor,
wherein the prioritized presentation scheme is changeable after the application catalog is received at the wireless device based upon an end-user input.

35. An apparatus for providing an application catalog over a wireless network, comprising:
means for sorting each of a plurality of applications that are available for download into either a first set of preferred applications or a second set of applications based on at least one ranking criteria that includes, for one or more of the plurality of applications, a fiscal factor related to profit associated with purchasing of the one or more of the plurality of applications;
means for generating the application catalog comprising a list of the first and second sets of applications, wherein the application catalog is configured with a prioritized presentation scheme that presents the first set of preferred applications more prominently than the second set of applications to one or more wireless device users based on the fiscal factor;
means for receiving a request from a wireless device for the application catalog; and
means for transmitting the application catalog to the wireless device,
wherein the prioritized presentation scheme is changeable after the application catalog is transmitted to the wireless device based upon an end-user input.

36. The apparatus of claim 35, wherein the at least one ranking criteria further includes preferential list placement within the application catalog that is allocated to an advertiser for the one or more of the plurality of applications.

37. The apparatus of claim 35, wherein the fiscal factor includes the profit made by one or more of the plurality of applications, wherein a first application having a first profit made is sorted in the first set of preferred applications and a second application having a second profit made is sorted in the second set of applications if the first profit made is greater than the second profit made.

38. The apparatus of claim 35, wherein the fiscal factor includes for a respective application from the one or more of the plurality of applications a per-purchase profit multiplied by a sales number corresponding to the respective application.

39. An apparatus for providing an application catalog over a wireless network, comprising:
a processor configured to sort each of a plurality of applications that are available for download into either a first set of preferred applications or a second set of applications based on at least one ranking criteria that includes, for one or more of the plurality of applications, a fiscal factor related to profit associated with purchasing of the one or more of the plurality of applications, and to generate the application catalog comprising a list of the first set of preferred applications and the second set of applications, wherein the application catalog is configured with a prioritized presentation scheme that presents the first set of preferred applications more prominently than the second set of applications to one or more wireless device users based on the fiscal factor; and
a communications interface configured to receive a request from a wireless device for the application catalog, and to transmit the application catalog to the wireless device,
wherein the prioritized presentation scheme is changeable after the application catalog is transmitted to the wireless device based upon an end-user input.

40. The method of claim 30, wherein the allocated preferential list placement is allocated to the advertiser based upon a purchase of the allocated preferential list placement by the advertiser.

* * * * *